May 30, 1933.  O. U. ZERK  1,912,239
LUBRICATING APPARATUS
Filed May 19, 1930  3 Sheets-Sheet 1
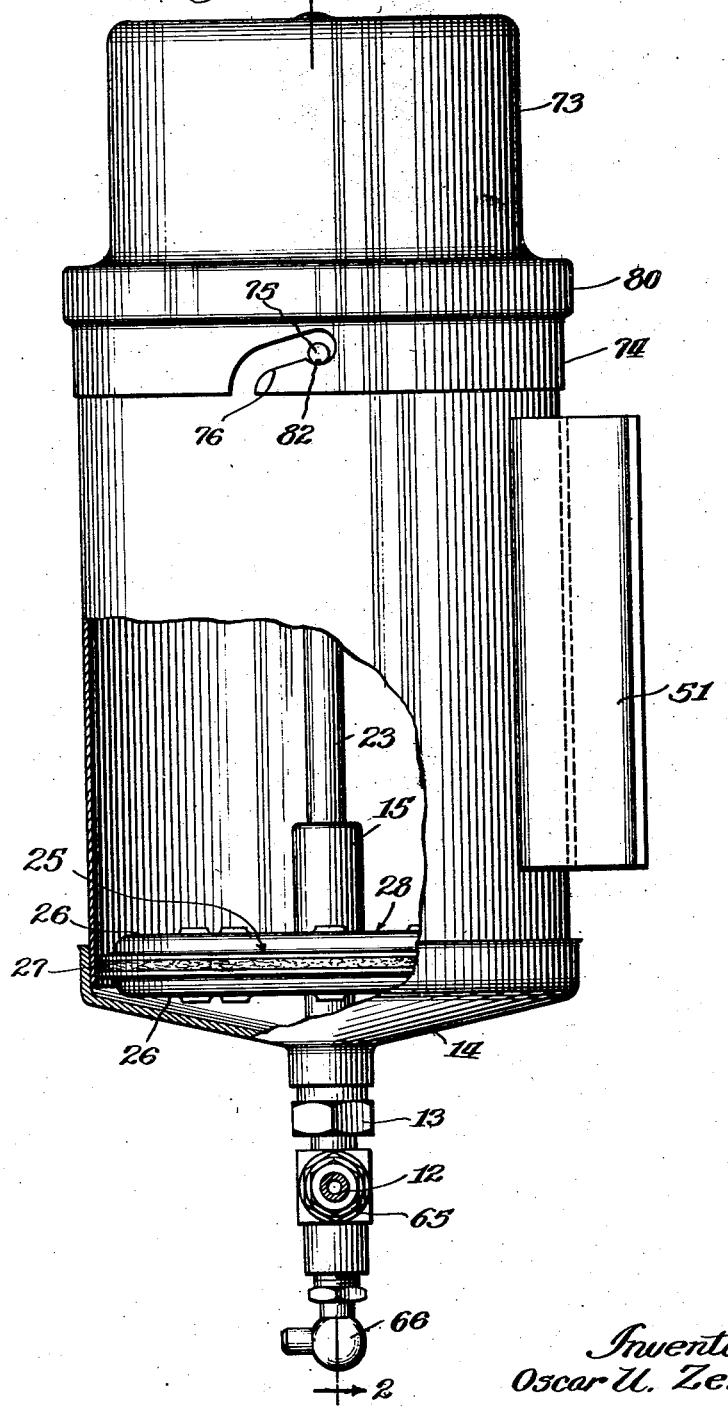
Inventor
Oscar U. Zerk

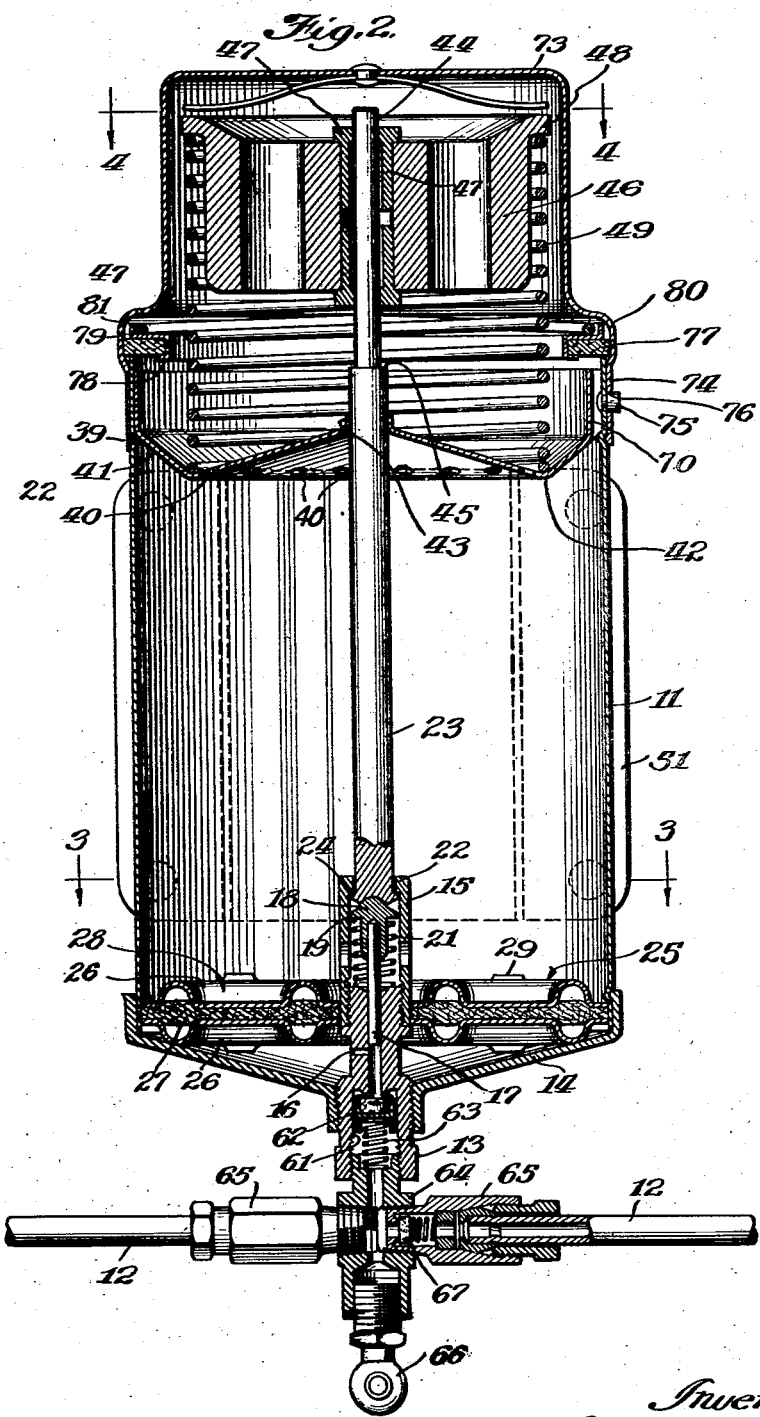

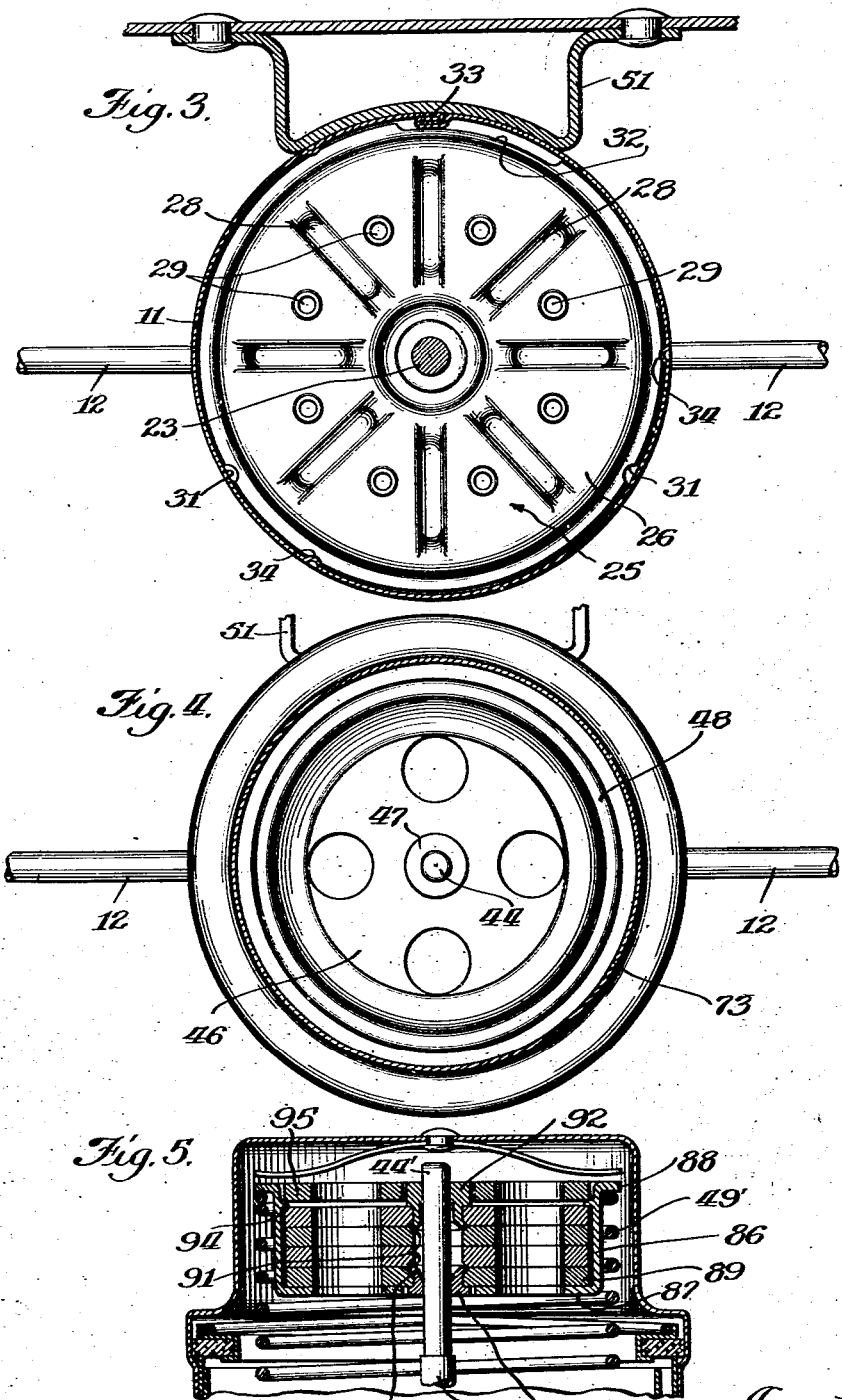

Patented May 30, 1933

1,912,239

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING APPARATUS

Application filed May 19, 1930. Serial No. 453,496.

My invention relates to improvements in lubricating apparatus and is particularly concerned, though not limited, to the provision of a lubricating apparatus for use upon automotive vehicles.

One of the problems involved in a lubricating apparatus of the inertia operated type is to properly regulate the amount of lubricant supplied to the bearings of the vehicles so that the lubricant will not be supplied too freely at times when the vehicle is at a standstill or moving slowly.

An object of the invention is to provide a new and improved lubricating apparatus for a motor vehicle which is simple in construction and effective in operation.

A further object is to provide a lubricating apparatus for a motor vehicle in which lubricant is supplied to the vehicle bearings in accordance with the requirements of the apparatus while in motion.

A further object is to provide a lubricating apparatus for a motor vehicle requiring a predetermined movement of the vehicle to supply lubricant to the vehicle bearings.

A further object is to provide a lubricating apparatus for a vehicle having a lost motion effect to limit the amount of lubricant supplied to the vehicle bearings.

A further object is to provide a lubricating apparatus for a vehicle adapted to filter the lubricant, preventing sediment from reaching the vehicle bearings.

Other objects and advantages will appear as the description proceeds.

Referring to the drawings:

Fig. 1 is a fragmentary side elevation of a lubricating apparatus embodying my invention;

Fig. 2 is a cross sectional view taken on the line 2—2 of Fig. 1;

Fig. 3 is a section through the lubricating apparatus taken on line 3—3 of Fig. 2;

Fig. 4 is a section of the lubricating apparatus taken on line 4—4 of Fig. 2; and Fig. 5 is a fragmentary section showing a modified form of weight for actuating the lubricating mechanism.

The apparatus is adapted to supply lubricant from a container 11 through a plurality of tubes 12, each of which leads to a plurality of bearings of the motor vehicle. The apparatus may be used in connection with resistance devices such as disclosed in my co-pending application Serial No. 207,609, filed July 22, 1927 which was issued March 24, 1931, as Patent No. 1,797,280. These resistance elements are interposed between the bearings and supply tubes 12 and serve to apportion the lubricant to the several bearings.

A cylinder 13 is threaded through the downwardly dished bottom 14 of the container and extends vertically upward in the container. The upper portion of the cylinder is threaded to receive a sleeve 15 forming an extension of the cylinder. The side wall of the cylinder is provided with an aperture 16 spaced upwardly from the bottom of the container, thus forming a sediment trap for the accumulation of sediment in the bottom of the container.

A piston 17 is reciprocally mounted within the cylinder and has a portion extending therefrom to which a head 18 having a radially extending flange 19 is secured. A spring 21 is interposed between flange 19 and the end of the cylinder and serves to normally maintain the piston in its upper position. The upper end of sleeve 15 is provided with an inwardly extending flange 22. Extending downwardly into the sleeve is a rod 23 for actuating the piston. Rod 23 is provided with a head 24 and extends into the sleeve, the head limiting the upward movement of the rod. The rod 23 loosely engages head 18 of the piston and serves to impart a downward movement upon the head. Normally the rod is held in its upper position by the spring 21, which retracts the piston.

Surrounding the cylinder and engaging the side wall of the container is a filter device 25 comprising a pair of disc-shaped plates 26 having their annular peripheries bent inwardly to clamp a filter member 27 of felt or other suitable material therebetween. Each of the plates is provided with a plurality of radially extending depressions 28, which contact with the filter member and serve to support it in position. The plates have a plurality of aligned apertures 29 between each pair of depressions 28. These apertures are formed outwardly from the plates providing an upwardly extending ridge around the apertures in the upper plate and a downwardly extending ridge around the apertures in the lower plate.

In order to secure the filter device 25 within the container the device is provided with notches 31 and a large cutout portion 32 around its periphery. The cutout portion 32 is adapted to be located adjacent the seam 33 of the container. The container is provided with a plurality of inwardly extending bosses 34 which are similarly spaced with respect to notches 31.

In placing the filter device in the container the notches 31 are longitudinally aligned with bosses 34, allowing the filter device to be moved downwardly until it reaches a position in which the bosses 34 are above the filter device. The filter device is then rotated clockwise as shown in Fig. 3 to dis-align the notches 31 and bosses 34, thereby securing the filter device firmly in position.

On account of the upwardly extending ridges in the upper plate 26, sediment will be prevented from draining through the apertures and will be collected in depressions 28 and in the annular groove surrounding the filter device.

In the upper portion of the container is a support 41 for the actuating mechanism of the apparatus. The support comprises a cylindrical portion engaging the wall of the container and has an inwardly projecting portion which extends first downwardly and then upwardly forming a V-shaped groove 42. The upwardly projecting portion terminates in a collar 43, which forms a guide for rod 23. Support 41 has a plurality of holes 40 therein to allow the lubricant to pass into the container to fill the container without removing the support. A plurality of studs 39 formed in the wall of the container serve to retain the support in place.

The rod 23 has an upper reduced portion 44 forming a shoulder 45 upon the rod. A weight 46 is provided with a central aperture in which collars 47 are mounted. These collars slidably support the weight upon the reduced portion 44 of rod 23. The weight is provided with an outwardly extending flange 48 which rest upon a spring 49 mounted in the V-shaped groove 42 of support 41.

The container may be supported upon the dash board of a vehicle by a bracket 51. Upon a movement of the vehicle weight 46 will oscillate vertically upon spring 49. The lateral movement of the weight is prevented by rod 23 which is supported in sleeve 15 and collar 43. The reduced portion of rod 23 is of sufficient length that the weight may oscillate a considerable distance without actuating the piston so as to prevent pumping of lubricant into the supply lines when the weight is oscillated only a small amount as, for instance, when the motor is in operation but the vehicle is at a stand-still. As soon as the vehicle is set in motion weight 46 will oscillate sufficiently to strike the shoulder 45 of rod 23, causing a downward movement of this rod which is communicated to the piston, causing the piston to move by aperture 16 and pump oil into the supply lines. The lower portion of the cylinder is provided with an enlarged bore 61 adapted to receive a valve 62. Valve 62 is held in its closed position by a spring 63 which rests against the end of a multiple plug 64 threaded into the end of the cylinder. The multiple plug is adapted to receive a plurality of plugs 65 by which connection is made with supply lines 12. A nipple 66 is also threaded into the plug 64 by means of which the system may be primed and lubricant forced to the bearings by a hand-pump. Each plug 65 is provided with a valve 67 to prevent siphoning of the fluid from one supply line to another.

The container is closed by a cup-shaped cap 73 having a cylindrical portion 74 for engaging the outer upper surface of the container. A plurality of studs 75 are provided on the container which are adapted to engage inclined slots 76 in the cylindrical portion 74 of the cap to retain the cap on the container.

Support 41 may be provided with grooves 70 to receive the riveted heads of studs 75 on the inside of the container. Above the cylindrical portion 74 cap 73 is provided with an annular enlarged portion 80. Located within the enlarged portion 80 is a flat cork ring 77. The cork ring is reinforced by a metallic ring 78 which embraces the inner edge of the cork ring and extends outwardly on the upper surface of the cork ring to a diameter equal to the diameter of the container. The metallic ring is provided with a flange 79 within which a spring 81 is located. Spring 81 engages the upper face of enlarged portion 80 and tends to force the cork ring downwardly. It will be seen that in placing the cap upon the container and engaging the studs 75 with notches 76 the upper edge of the container will engage the under surface of the cork ring with the result that the spring 68 will tend to firmly seat the cork on the container and raise the cap to retain the studs within depressions 82 in the notches 76 to hold the cap securely upon the container.

The operation of the apparatus is as follows: In order to supply the container with lubricant the cap is removed, leaving the weight and supporting mechanism within the container. Lubricant is then poured into the container and the cap is replaced.

When the vehicle is in motion there is a certain amount of vertical movement which, however slight, will, due to the inertia of the weight, cause the weight to oscillate upon the spring. The vibration of the motor will be sufficient to cause a considerable oscillation of the weight. However, it is not necessary or desirable to supply lubricant to the vehicle unless the vehicle is in motion. For this reason the reduced portion of rod 23 is made of sufficient length to provide a certain amount of lost motion so that no lubricant will be supplied to the system unless the weight moves far enough to strike shoulder 45 and actuate the piston. By this arrangement the vehicle bearings will be supplied with lubricant only when the lubricant is required—that is, when the vehicle is in motion.

Fig. 5 illustrates a modified form of weight comprising a cup-shaped member 86 having a perforated bottom 87 and an outwardly extending flange 88 at its upper edge, by means of which the weight is supported on spring 49'. Placed within the cup-shaped member 86 are a plurality of weights 89 which rest upon the bottom 87. The weights are provided with grooves 91 within a central aperture therein. A collar 92 is inserted in the central aperture of the weights from each end and a flange 93 is formed on each collar extending into a groove 91, thereby securing the collars on the weights. The collars are adapted to slidably mount the weight upon the reduced portion 44' of rod 23'.

An inwardly extending flange 94 may be formed in the cup-shaped member 86 and bear against the upper weight to retain the weights within the cup-shaped member. If it is desired to increase the weight of the unit an additional weight 95 may be loosely placed within the cup. Thus, by making the weight adjustable the device can be adjusted to supply the vehicle with lubricant of various consistencies as, for instance, if a heavy lubricant is used the weight may be increased on account of the greater force required to force the heavy lubricant to the bearings.

Having described the nature and embodiments of my invention, what I desire to secure by United States Letters Patent is as follows:

1. In a lubricating apparatus for a vehicle having a plurality of bearings, a container for lubricant, a cylinder therein having an aperture in its wall, a piston reciprocable in the cylinder and extending therefrom, a head secured to the extending portion of the piston, a spring abutting the end of the cylinder and engaging said head, a sleeve secured to the cylinder and surrounding the head, a rod projecting into the sleeve and engaging the head on the piston, an oscillating weight responsive to movements of the vehicle for actuating the piston through said rod, and a valve at the outlet of the piston leading to the bearing whereby lubricant will be supplied to the bearings in accordance with the movement of the vehicle.

2. In a lubricating apparatus for a vehicle having a plurality of bearings, a container for lubricant, supply tubes leading to said bearings, a cylinder in the container, a piston therein and projecting therefrom, a sleeve surrounding the projecting portion of the piston, an inturned flange at the end of the sleeve, a rod extending into the sleeve and having a head engaging said flange to limit the retractile movement of the rod, a spring for normally retaining the head against the flange, and an oscillating weight for actuating said rod and piston to supply lubricant to the bearings.

3. In a lubricating apparatus for a motor vehicle, a container for lubricant, a pump in the container for supplying lubricant to the vehicle, a rod for actuating the pump, an oscillating weight slidably mounted on the rod, said rod having a shoulder engageable by the weight upon a predetermined movement of the weight providing a lost motion effect, and a spring for normally supporting the weight above the shoulder on the rod.

4. In a lubricating apparatus for a motor vehicle, a container for lubricant, means for supplying lubricant to the vehicle, a rod for actuating said means, a weight in the container, a spring for supporting the weight, and a lost motion connection between the weight and the rod for regulating the amount of lubricant supplied to the vehicle.

In witness whereof, I hereunto subscribe my name this 14th day of May, 1930.

OSCAR U. ZERK.